(12) United States Patent
Hicks et al.

(10) Patent No.: US 11,182,279 B1
(45) Date of Patent: Nov. 23, 2021

(54) OPTIMIZING TEST CASE EXECUTION

(71) Applicant: International Business Machines Corporation, Armonk, NY (US)

(72) Inventors: Andrew C. M. Hicks, Wappingers Falls, NY (US); Ryan Thomas Rawlins, New Paltz, NY (US); Deborah A. Furman, Staatsburg, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/988,805

(22) Filed: Aug. 10, 2020

(51) Int. Cl.
*G06F 11/00* (2006.01)
*G06F 11/36* (2006.01)

(52) U.S. Cl.
CPC ...... *G06F 11/3688* (2013.01); *G06F 11/3684* (2013.01); *G06F 11/3692* (2013.01)

(58) Field of Classification Search
CPC ............. G06F 11/3688; G06F 11/3692; G06F 11/3684; G06F 11/368
See application file for complete search history.

(56) References Cited

U.S. PATENT DOCUMENTS

| 8,756,460 | B2 | 6/2014 | Blue et al. |
| 9,311,223 | B2 | 4/2016 | Bartley et al. |
| 9,489,289 | B2 | 11/2016 | Hu et al. |
| 2020/0242010 | A1* | 7/2020 | Hicks ............ G06F 11/3616 |
| 2020/0242012 | A1* | 7/2020 | Hicks ............ G06F 11/263 |

FOREIGN PATENT DOCUMENTS

CN 107678972 A 2/2018

OTHER PUBLICATIONS

Bach et al., "Coverage-based reduction of test execution time: Lessons from a very large industrial project," 10th IEEE International Conference on Software Testing, Verification and Validation Workshops (ICSTW), Mar. 2017, pp. 3-12.
Stratis et al., "Test case permutation to improve execution time," Proceedings of the 31st IEEE/ACM International Conference on Automated Software Engineering, Sep. 2016, pp. 45-50.

* cited by examiner

*Primary Examiner* — Katherine Lin
(74) *Attorney, Agent, or Firm* — Cantor Colburn LLP; Teddi Maranzano

(57) ABSTRACT

Aspects of the invention include determining a functional coverage model for a system under test (SUT), the functional coverage model comprising a plurality of attributes, wherein each attribute includes a set of values, determining a set of test cases having n-wise test coverage for the SUT, executing one or more test cases to determine an execution bottleneck value in a first set of values for a first attribute, analyzing the set of test cases to determine a first test case having the execution bottleneck value for the first attribute, the execution bottleneck value having a larger execution metric than a second value, determining that the first set of values for the first attribute in the first test case is moot for the n-wise test coverage for the SUT, and replacing the execution bottleneck value for the first attribute in the first test case with the second value.

20 Claims, 5 Drawing Sheets

OPTIMIZING TEST CASE EXECUTION

BACKGROUND

The present invention generally relates to testing of a computer program, and more specifically, to optimizing test case execution to eliminate bottlenecks in a test case set.

Computerized devices control almost every aspect of our life—from writing documents to controlling traffic lights. However, computerized devices can be error—prone, and thus require a testing phase in which the errors, or bugs, should be discovered. The testing phase is considered one of the most difficult tasks in designing a computerized device. The cost of not discovering a bug may be enormous, as the consequences of the bug may be disastrous. Additionally, a bug in hardware or firmware may be expensive to fix if it is discovered after the computerized device has shipped to customers, as patching it may require call-back of the computerized device. Hence, many developers of computerized devices invest a substantial portion of the development cycle to discover erroneous behaviors of the computerized device.

During the testing phase a system under test (SUT) is being tested. The SUT may be, for example, a computer program, a hardware device, firmware, an embedded device, a component thereof, or the like. Testing may be performed using a test suite that includes test cases. The test suite may be reused to revalidate that the SUT exhibits a desired functionality with respect to the tests of the test suite. For example, the test suite may be reused to check that the SUT works properly after a bug is fixed. The test suite may be used to check that the bug is indeed fixed (with respect to a test that previously induced the erroneous behavior). Additionally, or alternatively, the test suite may be used to check that no new bugs were introduced (with respect to other tests of the tests suite that should not be affected by the bug fix).

Combinatorial test design (CTD) is a testing methodology that seeks to increase test space coverage for a SUT through the use of automated algorithms. These algorithms identify input patterns that are most likely to locate problems in the SUT, thereby reducing the amount of time required for a tester to build test cases by providing an automation framework. CTD is well-adapted for projects that require numerous variations on static input vectors to properly test various system states and logic pathways, which would otherwise be extremely cumbersome for a human tester. CTD provides enhanced testing efficiency over manual testing through the use of automated algorithms.

SUMMARY

Embodiments of the present invention are directed to a method for optimizing test case execution. A non-limiting example computer-implemented method includes determining a functional coverage model for a system under test (SUT), the functional coverage model comprising a plurality of attributes, wherein each attribute in the plurality of attribute includes a set of values, determining a set of test cases having n-wise test coverage for the SUT based on the functional coverage model, executing one or more test cases in the set of test cases to determine an execution bottleneck value in a first set of values for a first attribute in the plurality of attributes, analyzing the set of test cases to determine a first test case having the execution bottleneck value for the first attribute, the execution bottleneck value having a larger execution metric than a second value in the first set of values, determining that the first set of values for the first attribute in the first test case is moot for the n-wise test coverage for the SUT, and replacing the execution bottleneck value for the first attribute in the first test case with the second value.

Embodiments of the present invention are directed to a system for optimizing test case execution. A non-limiting example system includes a processor coupled to a memory, the processor configured to perform a method including determining a functional coverage model for a system under test (SUT), the functional coverage model comprising a plurality of attributes, wherein each attribute in the plurality of attribute includes a set of values, determining a set of test cases having n-wise test coverage for the SUT based on the functional coverage model, executing one or more test cases in the set of test cases to determine an execution bottleneck value in a first set of values for a first attribute in the plurality of attributes, analyzing the set of test cases to determine a first test case having the execution bottleneck value for the first attribute, the execution bottleneck value having a larger execution metric than a second value in the first set of values, determining that the first set of values for the first attribute in the first test case is moot for the n-wise test coverage for the SUT, and replacing the execution bottleneck value for the first attribute in the first test case with the second value.

Embodiments of the present invention are directed to a computer program product for optimizing test case execution, the computer program product including a computer readable storage medium having program instructions embodied therewith. The program instructions are executable by a processor to cause the processor to perform a method. A non-limiting example of the method includes determining a functional coverage model for a system under test (SUT), the functional coverage model comprising a plurality of attributes, wherein each attribute in the plurality of attribute includes a set of values, determining a set of test cases having n-wise test coverage for the SUT based on the functional coverage model, executing one or more test cases in the set of test cases to determine an execution bottleneck value in a first set of values for a first attribute in the plurality of attributes, analyzing the set of test cases to determine a first test case having the execution bottleneck value for the first attribute, the execution bottleneck value having a larger execution metric than a second value in the first set of values, determining that the first set of values for the first attribute in the first test case is moot for the n-wise test coverage for the SUT, and replacing the execution bottleneck value for the first attribute in the first test case with the second value.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
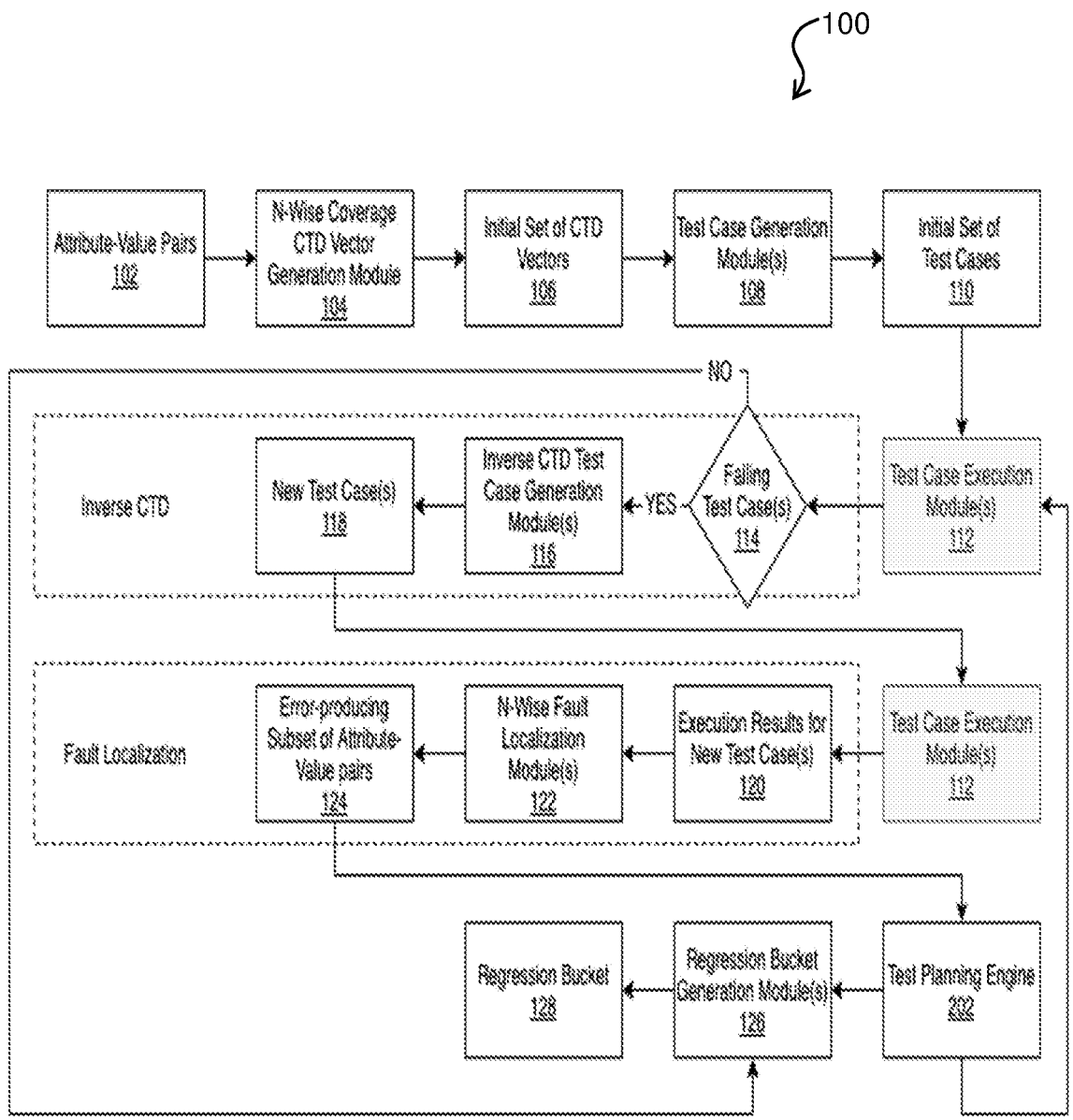
FIG. 1 is schematic hybrid data flow/block diagram illustrating fault detection and localization using Combinatorial Test Design (CTD) techniques and generation of a regression bucket of failing test cases that expose a detected fault in accordance with one or more example embodiments of the invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describe having a communications path between two elements and does not imply a direct connection between the elements with no intervening elements/connections between them. All of these variations are considered a part of the specification.

DETAILED DESCRIPTION

Exemplary embodiments of the present invention relate to optimizing test case order such that timing bottlenecks can be removed by selecting optimal values for attributes for testing performed on a system under test (SUT). The SUT may be a hardware system or a software system. In example embodiments, inputs to a SUT can be modeled as a collection of attributes, each of which is eligible to take on one or more corresponding attribute values to form attribute-value pairs. For n-wise testing (described in greater detail below), test planning techniques can provide for a set of test cases to execute to ensure n-wise coverage for the testing space. However, since some test cases may include so called moot attributes, the selection of corresponding attribute values are equally moot. A moot attribute refers to an attribute where the selection of an attribute value for the moot attribute does not affect the test cases for n-wise testing. That is to say, any attribute value can be selected for a moot attribute and it will not affect the testing coverage. However, in some test cases, the attribute value selection can have an effect on execution time of the test case as well as other execution metrics such as memory usage. When the attribute values are determined to be moot with respect to the n-wise test coverage, aspects of the present invention select these attribute values to optimize performance (e.g., execution timing) of the test cases.

Test planning is based on a modeling of the test space (all attribute-value pairs) using a functional coverage model. The functional coverage model can include a set of attributes, a respective domain of possible values for each attribute, and restrictions on the value combinations across attributes. A set of valid value combinations across the attributes can define the functional coverage test space. Functional coverage models do not typically scale well. In cases where the value combinations of the model are represented explicitly, the model may become very large. For example, consider a model with thirty (30) attributes and three (3) values per attribute. This defines a model with $3^{\wedge}30$ attribute and value combinations, which requires a large memory capacity. Practically speaking, this model may be too large to be explicitly represented in memory. In addition to representing the model, there are operations that are used during the development of the model, such as viewing projections of the model and extracting various views that help in making sure that the model is consistent and complete. Such operations, when performed with respect to explicit representation and enumeration of the test space, can encounter scalability issues. Additional factors to consider for test coverage include, but are not limited to, test execution time and prioritization of tests (i.e., testing coverage portions with a higher priority).

One exemplary test planning technique is Combinatorial Test Design (CTD), also referred to as n-wise testing. CTD is designed to select a subset of a test space so as to cover all possible combinations of every two (or three or four) functional attributes. The required coverage of the selected subset is referred to as "interaction level" (i.e., interaction level 2 can mean that for every two functional attributes, all valid value combinations must appear in the selected subset of the test space). Limiting the possible combinations of attributes to two, for example, will greatly reduce the test space and relies on the approach that most bugs depend on the interaction between the values of a small number of parameters in order to have their effect appear (n-wise interaction). The entire test space defined by the functional coverage model is usually much larger than a test space in which only pairs, triplets, quadruplets, or the like for the n-wise coverage are required to be covered. Therefore, a significantly smaller number of tests may be used, and it is likely to find most, if not all, of the bugs in the SUT. CTD algorithms can address scalability issues. These algorithms can assume that the test space is too large to be represented explicitly, and they use various techniques generate an optimized test plan without explicitly enumerating all possible combinations. CTD is a test planning technique that selects a small subset of the valid test space that covers a predefined coverage goal. The coverage goal may define an interaction level of attributes that are to be covered, such as every n-wise combinations of values. That is to say, the entire Cartesian product space that contains all possible combinations of attribute-value pairs can be reduced to a smaller set of test vectors that provides complete n-wise coverage of the test space across all attribute values using, for example, CTD. In example embodiments, a binary decision diagram or the like may be used to perform the reduction and identify the reduced set of CTD vectors that provides complete pairwise coverage.

When performing combinatoric reduction of a testing space (e.g., pairwise testing), once the combinations of values have been met for a pair of attributes (e.g., A-B), any remaining tests that are identified for other attributes (e.g., C-D) will indeterminately choose values for A-B (moot attributes) which are not the most optimal with regards to the timing (or other metrics) of the order of function being run by the test. Aspects of the present invention address the above identified drawback by selecting the most optimal values of moot attributes in a testing space after combinatoric reduction which reduces these bottlenecks in the order of test execution. That is to say, when the selection of an attribute value become moot after completion of a portion of an n-wise testing, future attribute values are utilized in upcoming test cases that minimize certain execution metrics such as, for example, processing time, memory usage, and the like.

Turning now to FIG. 1, there is shown a schematic hybrid data flow/block diagram illustrating fault detection and localization using CTD techniques and generation of a regression bucket of failing test cases that expose a detected fault in accordance with one or more example embodiments of the present invention. Inputs to a SUT are modeled as a collection of attribute value pairs 102. Any number of attributes may be used to model SUT inputs and each attribute may take on any number of candidate attribute values. In example embodiments of the present invention, computer-executable instructions of one or more n-wise coverage CTD vector generation modules 104 are executed to generate an initial set of CTD vectors 106 that provides n-wise coverage of an entire Cartesian product space associated with the collection of attribute-value pairs 102.

In one or more examples, the entire Cartesian product space that contains all possible combinations of the attribute-value pairs 102 is reduced to a smaller set of CTD test vectors 106 that provides complete n-wise coverage of the entire test space. In example embodiments of the present invention, the complete n-wise coverage provided by the set of CTD vectors 106 may be complete pairwise coverage. For instance, if it is assumed that three attributes are modeled, namely, a "name" attribute, a "color" attribute, and a "shape" attribute, and if it is further assumed that the "name" attribute can take on 4 distinct attributes (Dale, Rachel, Andrew, and Ryan), the "color" attribute can take on 2 distinct attributes (green, blue), and the "shape" attribute can take on 3 distinct attributes (circle, square, triangle), then the total number of possible combinations of attribute-value pairs would be 4*3*2=24. Thus, in this illustrative example, the entire Cartesian product space would include 24 different combinations of attribute-value pairs. In example embodiments, these 24 different combinations of attribute-value pairs are reduced down to a smaller set of combinations (i.e., the set of CTD vectors 106) that still provides complete n-wise coverage of the Cartesian product space. For instance, if complete pairwise coverage is sought, then the 24 different combinations can be reduced down to 12 distinct combinations that together include every possible pairwise interaction of attribute values.

In example embodiments, a binary decision diagram or the like may be used to perform the reduction and identify the initial set of CTD vectors 106 that provides complete n-wise coverage. While each CTD vector in the initial set of CTD vectors 106 includes a unique combination of attribute values, the initial set of CTD vectors 106 itself may not be unique. That is, there may be multiple different sets of CTD vectors, each of which provides complete n-wise coverage.

Referring again to FIG. 1, in example embodiments of the present invention, computer-executable instructions of one or more test case generation modules 108 may be executed to generate, from the initial set of CTD test vectors 106, a corresponding initial set of test cases 110, which are then executed by the test case execution module(s) 112 to yield an execution result (pass or fail) for each test case, as shown at decision block 114. For instance, the set of CTD test vectors 106 may be provided as input to a test case generation tool 108 configured to generate a respective corresponding test case for each CTD vector. Each test case in the set of test cases 110 may be designed to test the interactions among the particular combination of attribute values contained in a corresponding CTD vector of the set of CTD vectors 106. It should be appreciated that a set of CTD vectors and their corresponding test cases may, at times herein, be described and/or depicted interchangeably. In one or more embodiments of the present invention, the test case execution module 112 also include a test planning engine 202 (described in greater detail in reference to FIG. 2) that is utilized for optimizing test case execution by replacing attribute values within determined moot attributes that minimize execution metrics.

In example embodiments of the present invention, computer-executable instructions of the test case execution module(s) 112 are executed to determine whether any test cases in the set of test cases 110 failed. In example embodiments of the present invention, execution of each test case 110 results in either a successful execution result, indicating that the combination of attribute values contained in the corresponding CTD vector 106 does not contain an n-wise (or m-wise where m<n) error, or a failure execution result, indicating that the combination of attribute values in the corresponding CTD vector 106 does contain an n-wise (or m-wise where m<n) error. If none of the test cases fail, i.e., all test cases execute successfully, the testing system concludes that the SUT has no defects that are detected by the existing test cases and the decision block 114 indicates "No" and the system 100 proceeds to the regression bucket generation module 126 which builds out the regression bucket 128 where the initial set of test cases 110 are stored given no failure occur. Because the initial set of CTD vectors 106 (based on which the set of test cases 13 were generated) provided complete n-wise coverage, it can be ensured that an n-wise or lesser order error is not present. However, successful execution of all of the test cases in the initial set of test cases 110 does not ensure that a higher order error (k-wise where k>n) is not present.

On the other hand, in response to the execution of the set of test cases 110 resulting in one or more failing test cases (i.e., decision block 114 results in "Yes"), the system 100 proceeds to the inverse CTD phase. The inverse CTD phase includes block 116 and 118. In example embodiments, computer-executable instructions of one or more inverse CTD test case generation modules 116 are executed to take in the failing set of test cases and creates a new set of test vectors which is later used to make new test cases 118. That is to say, the testing system, using inverse CTD, selects a particular failing test case and produces a new set of test cases 118 that is used to detect and localize the combination of attribute values that are causing the n-wise or lesser order error. In addition, the testing system identifies similar test cases 128 to the failing test case 114 within the regression bucket 128. Application of inverse combinatorics to the selected failing test case includes finding similar test cases 128 with respect to each attribute of the failing test case. Once a failure producing subset of attribute values is identified, the remaining cases in the regression bucket 128 are scanned to identify similar combinations of attribute values. Such identified similar test cases are likely to fail for similar reason (i.e. same defect) as the failing test case itself.

In example embodiments of the present invention, after performing the inverse CTD, the process proceeds to fault localization which includes blocks 120-124. During the fault localization phase, the new test cases 118 are run using the test case execution module 112. The execution results 120 are determined as a pass/fail result. The N-wise fault localization module 122 determines what the error/bug in the software is and reports this bug as the error-production subset of attribute value pairs 124 which explains the error/bug. The explanation can be either a determination of the bug/error or a result stating that the bug/error is not identified. The fault localization phase can sometimes be referred to as root-cause analysis. The process then proceeds to the test planning engine 202 where a bug is determined in an attribute having a certain value. The test planning engine 202 can re-order the test set based on how the user set up testing priorities, as described in greater detail below. Further, the regression bucket generation module 126 builds out the regression bucket 128 which saves all the tests that are run. The saved test cases include the initial set of test cases 110 and any new test cases 118 generated during the inverse CTD phase.

Figure 2:
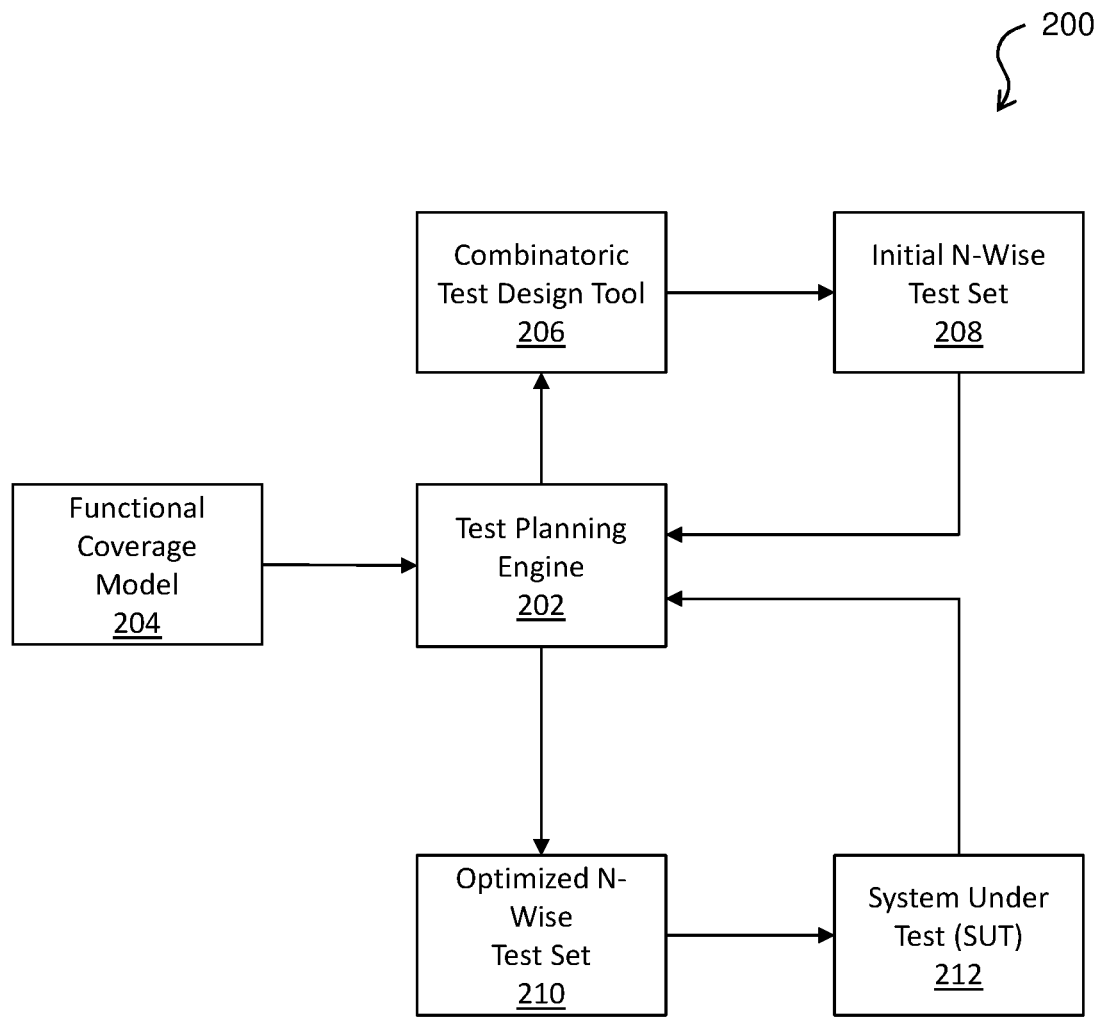
FIG. 2 depicts a block diagram of a system for optimizing test case order according to one or more embodiments of the present invention.

FIG. 2 depicts a block diagram of a system for optimizing test case execution according to one or more embodiments of the invention. The system 200 includes a test planning engine 202, a functional coverage model 204, and a CTD tool 206. In some embodiments of the present invention, the test planning engine 202 and the other components of the system 200 can be incorporated into the test case execution module(s) 112 (from FIG. 1). Here, the functional coverage model 204 represents the entire Cartesian product space that contains all possible combinations of attribute-value pairs for the SUT 212. The test planning engine 202 is configured to determine an initial n-wise test set 208 by utilizing the CTD tool 206. The initial n-wise test set 208 can be provided to the SUT 212 for execution of the test set. In one or more embodiments of the present invention, the test planning engine 202 monitors the execution of one or more test cases in the initial n-wise test set 208 to determine that a certain attribute-value pair value within an attribute requires larger execution metrics than another attribute value for the same attribute. The execution metric can be any system constraints such as, for example, a time of execution. When the attribute value becomes moot in, for example, a pair-wise testing space, this moot value can be chosen based on the execution metric in order to optimize the testing space. The attribute value is considered moot when the value does not have impact on the n-wise coverage for the testing space since it is fully covered by other test cases. Once identified, the test planning engine 202 can optimize the initial n-wise test set 208 to generate an optimized n-wise test set 210 for execution in the SUT 212.

Figure 3:
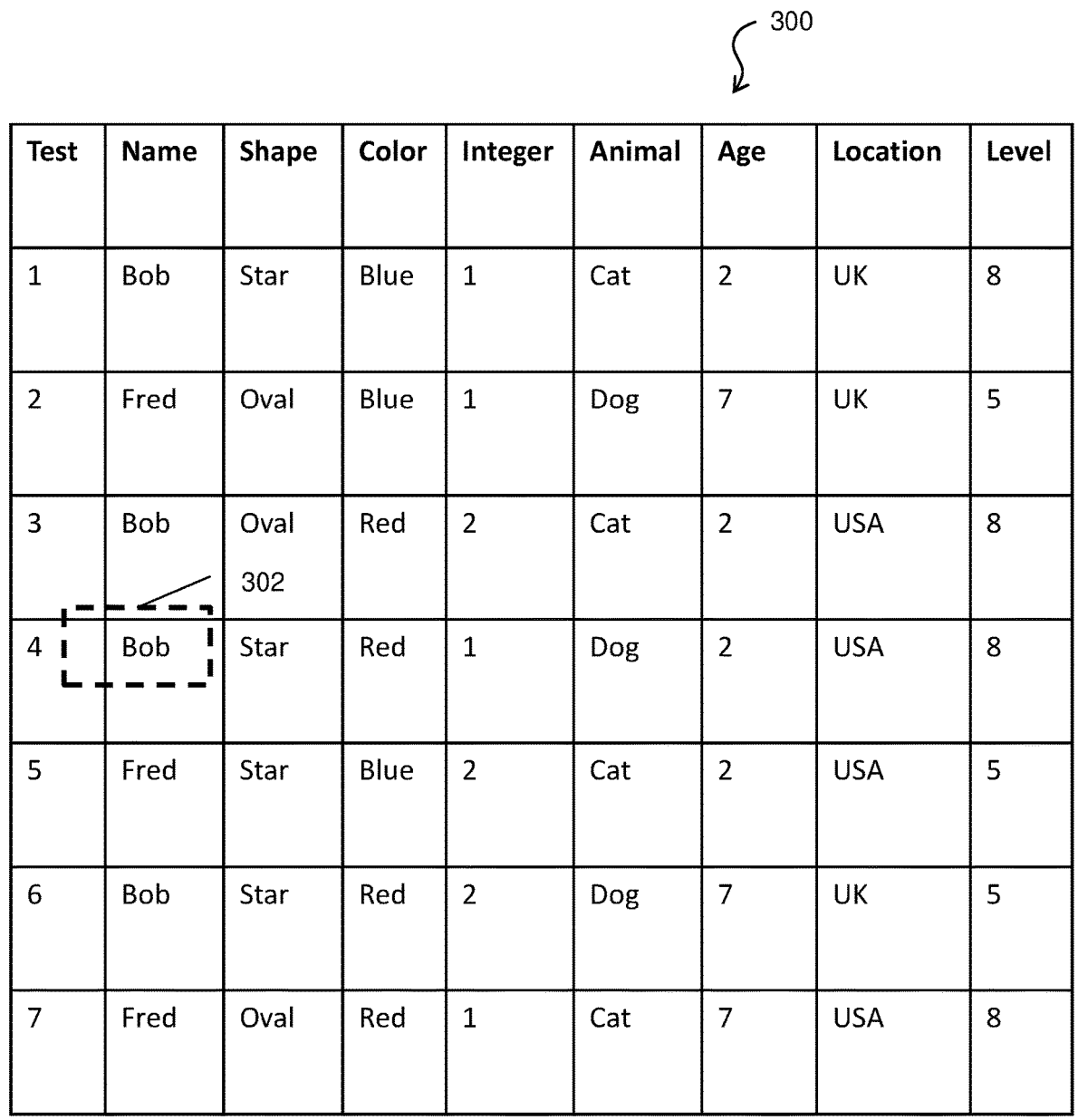
FIG. 3 depicts a table including exemplary attribute-value pairs for a set of initial pairwise test cases according to one or more embodiments of the present invention.

FIG. 3 depicts a table 300 including an example of attribute-value pairs for a set of initial pairwise test cases according to one or more embodiments of the invention. The table 300 includes a total of seven (7) tests for execution for a set of attributes having two values for each attribute. The attributes and associated values are: Name [Bob, Fred]; Shape [Star, Oval]; Color [Blue, Red]; Integer [1, 2]; Animal [Cat, Dog]; Age [2, 7]; Location [UK, USA]; and Level [5, 8]. In one or more embodiments, the table 200 of test cases represents test cases after a combinatoric reduction utilizing techniques such as, for example, a binary decision diagram (BDD). With eight (8) attributes having two (2) possible values, the total Cartesian test space would be 2^8 or 256 test cases. Utilizing CTD techniques, the total test case space for pairwise testing is reduced to a functional coverage test space of seven (7) test cases. That is to say, the entire Cartesian product space including all combinations of attribute values are first reduced down to an initial set of CTD test vectors that provides complete pairwise coverage across all attribute values.

In one or more embodiments, as shown in the table 300, each value/attribute pair combination is shown in the seven (7) test cases being represented. The test planning engine 202 (from FIG. 2) can initiate testing with the SUT 212 and determine, for example, that execution of a test case where the attribute value for Name is Bob takes 10 units of time to execute, while execution of a test case where the attribute value for Name is Fred only takes five (5) units of time to execute. In this example, the attribute value of Bob can be considered an execution bottleneck value because utilizing Bob instead of Fred will require additional execution metrics (i.e., time to execute). Also, the attribute "Name" at this point is considered a moot attribute so that the attribute value for Name can be analyzed to determine an execution bottleneck value. As mentioned above, attribute value Bob requires 10 units of time for execution whereas Fred requires only 5 units of time for execution. Since this is an execution bottleneck value being identified, further test cases can substitute Bob with Fred to reduce these execution metrics. Also, with this performance metric varying for execution, further optimization of the initial pairwise test case set can be performed by identifying where the attribute value for name is moot and ensuring that the value for name is Fred where the value is moot. This is performed by analyzing the pairwise test case set to determine a test case where the name attribute value of Bob is not needed to ensure pairwise test coverage. For example, test case 4 in the table 300 includes a name attribute of Bob 302 and is not required to ensure pairwise coverage for Bob+[Attribute value] because all combinations of Bob+[Attribute value] are represented in other test cases. For example, Test case 1 includes [Bob, Shape=Star], [Bob, Color=Blue], [Bob, Integer=1], [Bob, Animal=Cat], [Bob, Age=2], [Bob, Location=UK], and [Bob, Level=8]. The pairwise values can be found in other test cases other than test case 4. Test case 6 includes [Bob, Color=Red], [Bob, Integer=2], [Bob, Animal=Dog], [Bob, Age=7], [Bob, Location=UK], and [Bob, Level=5]. Also, test case 3 includes [Bob, Shape=Oval]. So, at this point, the attribute value for Name in test case 4 is moot and optimizing the test cases includes altering the attribute value of Name to Fred to, in this case, speed up the test case execution time overall. This process can be performed for all pairs of attributes based on a determination that the values require an increase in timing or other performance or execution metrics in the SUT.

In one or more embodiments of the invention, the test case optimization after a combinatoric reduction can resolve any conflicts in pairs of attributes that have values that are identified as moot by weighting these attribute values based on their performance improvement. Using table 300 attributes as an example, if the attribute values for Name have a difference of five (5) units of time for execution and the attribute values for Location have a difference of 10 units of time for execution, the attribute Location can be weighted higher such that priority is given to adjusting the Location over the Name attribute in the case there is a conflict in ensuring pairwise coverage of the test case set.

Figure 4:
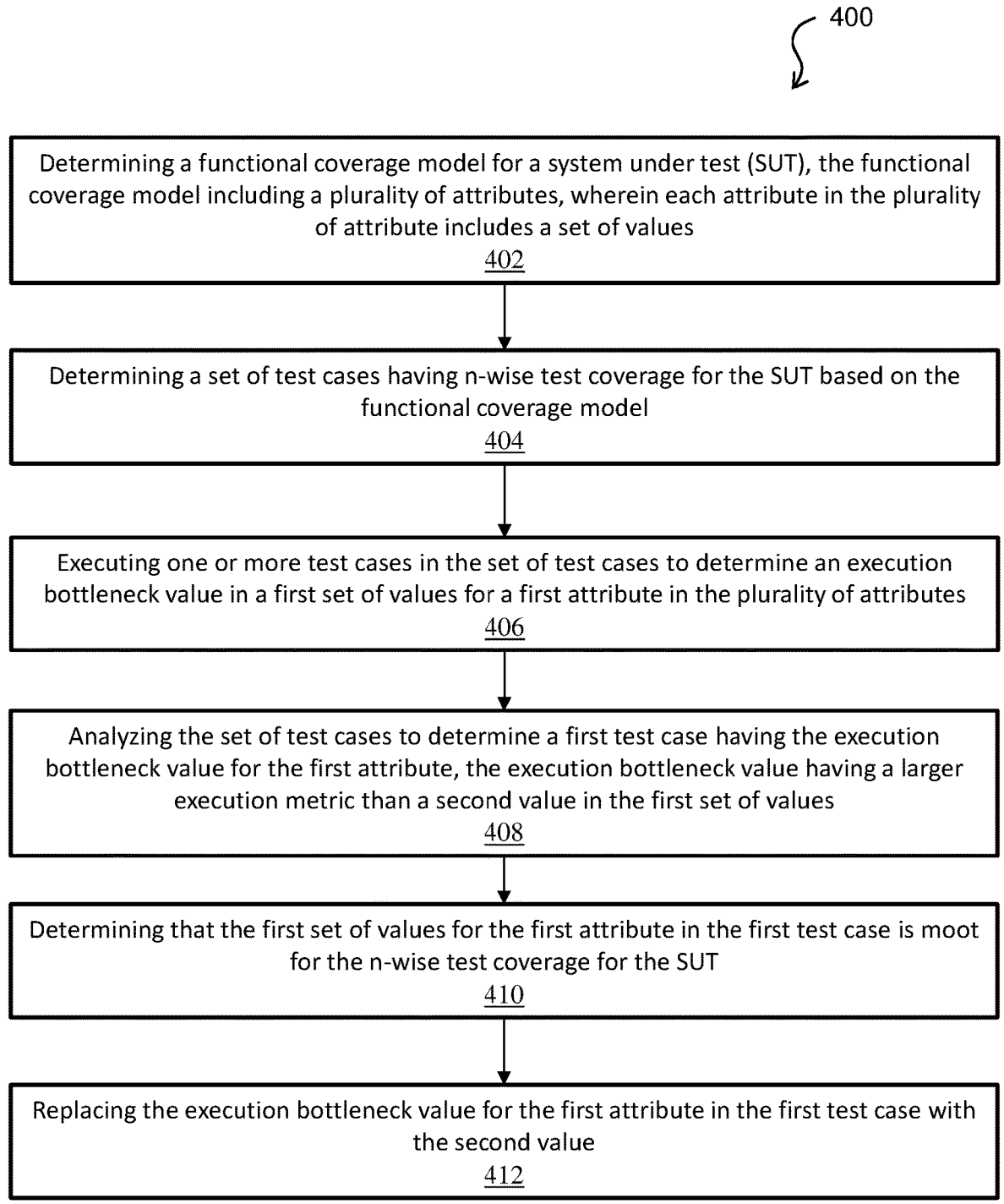
FIG. 4 depicts a flow diagram of a method for optimizing test case execution according to one or more embodiments of the present invention.

FIG. 4 depicts a flow diagram of a method 400 for optimizing test case execution to eliminate bottlenecks according to one or more embodiments of the invention. The method 400 includes determining a functional coverage model for a system under test (SUT), the functional coverage model including a plurality of attributes, where each attribute in the plurality of attribute includes a set of values, as shown in block 402. The functional coverage model includes the entire Cartesian product space that contains all possible combinations of attribute-value pairs for the SUT or some subset of the Cartesian product space depending on the objective of the testing. At block 404, the method 400 includes determining a set of test cases having n-wise coverage for the SUT based on the functional coverage model. The n-wise coverage can be, for example, a pairwise test coverage. The set of test cases can be determined utilizing CTD and/or binary decision diagrams. Also, at block 406, the method 400 includes executing one or more test cases in the set of test cases to determine an execution bottleneck value in a first set of values for a first attribute in the plurality of attributes. The execution bottleneck may include, for example, timing for execution and/or memory usage that would affect the execution of the set of test cases. The method 400, at block 408, includes analyzing the set of test cases to determine a first test case having the execution bottleneck value for the first attribute, the execution bottleneck value having a larger execution metric than a second value in the first set of values. Also, the method 400 includes determining that the first set of values for the first attribute in the first test case is moot for the n-wise test coverage for the SUT, as shown at block 410. And at block 412, the method 400 includes replacing the execution bottleneck value for the first attribute in the first test case with the second value.

Additional processes may also be included. It should be understood that the processes depicted in FIG. 4 represent illustrations, and that other processes may be added or existing processes may be removed, modified, or rearranged without departing from the scope and spirit of the present disclosure.

Figure 5:
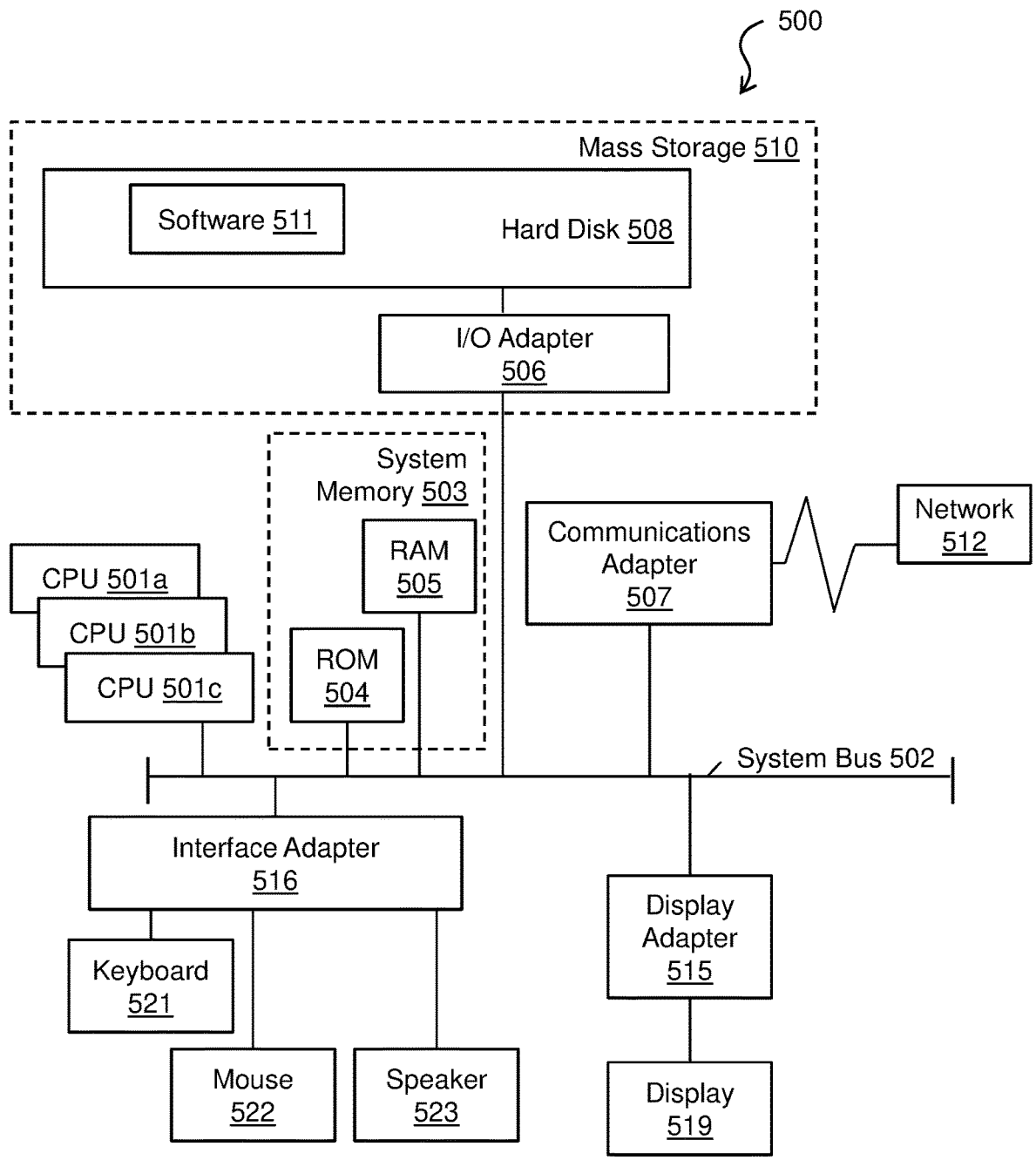
FIG. 5 depicts a block diagram of a computer system for use in implementing one or more embodiments of the present invention.

In one or more embodiments of the present invention, the test planning engine 202 and any of the hardware/software modules in the system 100 from FIG. 1 and system 200 from FIG. 2 can be implemented on the processing system 500 found in FIG. 5. Turning now to FIG. 5, a computer system 500 is generally shown in accordance with an embodiment. The computer system 500 can be an electronic, computer framework comprising and/or employing any number and combination of computing devices and networks utilizing various communication technologies, as described herein. The computer system 500 can be easily scalable, extensible, and modular, with the ability to change to different services or reconfigure some features independently of others. The computer system 500 may be, for example, a server, desktop computer, laptop computer, tablet computer, or smartphone. In some examples, computer system 500 may be a cloud computing node. Computer system 500 may be described in the general context of computer system executable instructions, such as program modules, being executed by a computer system. Generally, program modules may include routines, programs, objects, components, logic, data structures, and so on that perform particular tasks or implement particular abstract data types. Computer system 500 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, the computer system 500 has one or more central processing units (CPU(s)) 501a, 501b, 501c, etc. (collectively or generically referred to as processor(s) 501). The processors 501 can be a single-core processor, multi-core processor, computing cluster, or any number of other configurations. The processors 501, also referred to as processing circuits, are coupled via a system bus 502 to a system memory 503 and various other components. The system memory 503 can include a read only memory (ROM) 504 and a random access memory (RAM) 505. The ROM 504 is coupled to the system bus 502 and may include a basic input/output system (BIOS), which controls certain basic functions of the computer system 500. The RAM is read-write memory coupled to the system bus 502 for use by the processors 501. The system memory 503 provides temporary memory space for operations of said instructions during operation. The system memory 503 can include random access memory (RAM), read only memory, flash memory, or any other suitable memory systems.

The computer system 500 comprises an input/output (I/O) adapter 506 and a communications adapter 507 coupled to the system bus 502. The I/O adapter 506 may be a small computer system interface (SCSI) adapter that communicates with a hard disk 508 and/or any other similar component. The I/O adapter 506 and the hard disk 508 are collectively referred to herein as a mass storage 510.

Software 511 for execution on the computer system 500 may be stored in the mass storage 510. The mass storage 510 is an example of a tangible storage medium readable by the processors 501, where the software 511 is stored as instructions for execution by the processors 501 to cause the computer system 500 to operate, such as is described herein below with respect to the various Figures. Examples of computer program product and the execution of such instruction is discussed herein in more detail. The communications adapter 507 interconnects the system bus 502 with a network 512, which may be an outside network, enabling the computer system 500 to communicate with other such systems. In one embodiment, a portion of the system memory 503 and the mass storage 510 collectively store an operating system, which may be any appropriate operating system, such as the z/OS or AIX operating system from IBM Corporation, to coordinate the functions of the various components shown in FIG. 5.

Additional input/output devices are shown as connected to the system bus 502 via a display adapter 515 and an interface adapter 516 and. In one embodiment, the adapters 506, 507, 515, and 516 may be connected to one or more I/O buses that are connected to the system bus 502 via an intermediate bus bridge (not shown). A display 519 (e.g., a screen or a display monitor) is connected to the system bus 502 by a display adapter 515, which may include a graphics controller to improve the performance of graphics intensive applications and a video controller. A keyboard 521, a mouse 522, a speaker 523, etc. can be interconnected to the system bus 502 via the interface adapter 516, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 5, the computer system 500 includes processing capability in the form of the processors 501, and, storage capability including the system memory 503 and the mass storage 510, input means such as the keyboard 521 and the mouse 522, and output capability including the speaker 523 and the display 519.

In some embodiments, the communications adapter 507 can transmit data using any suitable interface or protocol, such as the internet small computer system interface, among others. The network 512 may be a cellular network, a radio network, a wide area network (WAN), a local area network (LAN), or the Internet, among others. An external computing device may connect to the computer system 500 through the network 512. In some examples, an external computing device may be an external webserver or a cloud computing node.

It is to be understood that the block diagram of FIG. 5 is not intended to indicate that the computer system 500 is to include all of the components shown in FIG. 5. Rather, the computer system 500 can include any appropriate fewer or additional components not illustrated in FIG. 5 (e.g., additional memory components, embedded controllers, modules, additional network interfaces, etc.). Further, the embodiments described herein with respect to computer system 500 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for optimizing test case execution, the method comprising:
   determining, by a processor, a functional coverage model for a system under test (SUT), the functional coverage model comprising a plurality of attributes, wherein each attribute in the plurality of attribute includes a set of values;
   determining a set of test cases having n-wise test coverage for the SUT based on the functional coverage model;
   executing one or more test cases in the set of test cases to determine an execution bottleneck value in a first set of values for a first attribute in the plurality of attributes;

analyzing the set of test cases to determine a first test case having the execution bottleneck value for the first attribute, the execution bottleneck value having a larger execution metric than a second value in the first set of values;

determining that the first set of values for the first attribute in the first test case is moot for the n-wise test coverage for the SUT; and replacing the execution bottleneck value for the first attribute in the first test case with the second value.

2. The computer-implemented method of claim 1, further comprising executing the first test case.

3. The computer-implemented method of claim 1, further comprising:

determining a second execution bottleneck value in a second set of values for a second attribute in the plurality of attributes;

analyzing the set of test cases to determine a second test case having the second execution bottleneck value for the second attribute, wherein the second execution bottleneck value comprises an execution metric greater than a third value in the second set of values;

determining that the second set of values for the second attribute in the second test case is moot for the n-wise test coverage for the SUT; and replacing the second execution bottleneck value for the second attribute in the second test case with the third value.

4. The computer-implemented method of claim 1, wherein determining the set of test cases having n-wise coverage for the SUT comprises:

performing a combinatoric reduction using a combinatorial design tool to generate the set of test cases having n-wise coverage.

5. The computer-implemented method of claim 4, wherein the combinator reduction is performed using a binary decision diagram.

6. The computer-implemented method of claim 1, wherein the execution metric comprises execution timing.

7. The computer-implemented method of claim 1, wherein the execution metric comprises memory footprint.

8. The computer-implemented method of claim 1, wherein the n-wise test coverage comprises pairwise test coverage.

9. A system comprising:

a memory having computer readable instructions; and one or more processors for executing the computer readable instructions, the computer readable instructions controlling the one or more processors to perform operations comprising:

determining a functional coverage model for a system under test (SUT), the functional coverage model comprising a plurality of attributes, wherein each attribute in the plurality of attribute includes a set of values;

determining a set of test cases having n-wise test coverage for the SUT based on the functional coverage model;

executing one or more test cases in the set of test cases to determine an execution bottleneck value in a first set of values for a first attribute in the plurality of attributes;

analyzing the set of test cases to determine a first test case having the execution bottleneck value for the first attribute, the execution bottleneck value having a larger execution metric than a second value in the first set of values;

determining that the first set of values for the first attribute in the first test case is moot for the n-wise test coverage for the SUT; and replacing the execution bottleneck value for the first attribute in the first test case with the second value.

10. The system of claim 9, further comprising executing the first test case.

11. The system of claim 8, further comprising:

determining a second execution bottleneck value in a second set of values for a second attribute in the plurality of attributes;

analyzing the set of test cases to determine a second test case having the second execution bottleneck value for the second attribute, wherein the second execution bottleneck value comprises an execution metric greater than a third value in the second set of values;

determining that the second set of values for the second attribute in the second test case is moot for the n-wise test coverage for the SUT; and replacing the second execution bottleneck value for the second attribute in the second test case with the third value.

12. The system of claim 9, wherein determining the set of test cases having n-wise coverage for the SUT comprises:

performing a combinatoric reduction, using a combinatorial design tool, to generate the set of test cases having n-wise coverage.

13. The system of claim 12, wherein the combinator reduction is performed using a binary decision diagram.

14. The system of claim 9, wherein the execution metric comprises execution timing.

15. The system of claim 9, wherein the n-wise test coverage comprises pairwise test coverage.

16. A computer program product comprising a computer readable storage medium having program instructions embodied therewith, the program instructions executable by a processor to cause the processor to perform operations comprising:

determining a functional coverage model for a system under test (SUT), the functional coverage model comprising a plurality of attributes, wherein each attribute in the plurality of attribute includes a set of values;

determining a set of test cases having n-wise test coverage for the SUT based on the functional coverage model;

executing one or more test cases in the set of test cases to determine an execution bottleneck value in a first set of values for a first attribute in the plurality of attributes;

analyzing the set of test cases to determine a first test case having the execution bottleneck value for the first attribute, the execution bottleneck value having a larger execution metric than a second value in the first set of values;

determining that the first set of values for the first attribute in the first test case is moot for the n-wise test coverage for the SUT; and replacing the execution bottleneck value for the first attribute in the first test case with the second value.

17. The computer program product of claim 16, further comprising executing the first test case.

18. The computer program product of claim 16, further comprising:

determining a second execution bottleneck value in a second set of values for a second attribute in the plurality of attributes;

analyzing the set of test cases to determine a second test case having the second execution bottleneck value for the second attribute, wherein the second execution bottleneck value comprises an execution metric greater than a third value in the second set of values;

determining that the second set of values for the second attribute in the second test case is moot for the n-wise test coverage for the SUT; and replacing the second execution bottleneck value for the second attribute in the second test case with the third value.

19. The computer program product of claim 16, wherein determining the set of test cases having n-wise coverage for the SUT comprises:

performing a combinatoric reduction, using a combinatorial design tool, to generate the set of test cases having n-wise coverage.

20. The computer program product of claim 16, wherein the n-wise test coverage comprises pairwise test coverage.

* * * * *